Leach & Hutchings,
Line Sinker.
No. 84,885.   Patented Dec. 15, 1868.
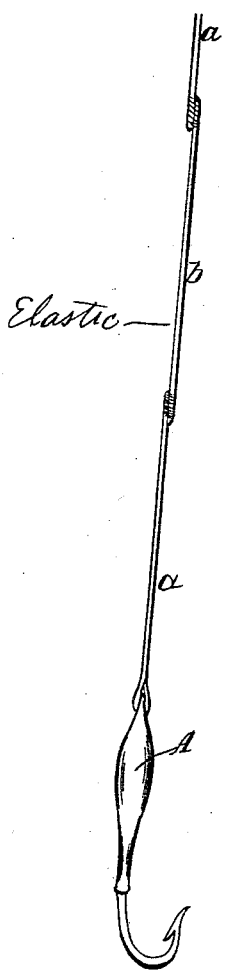
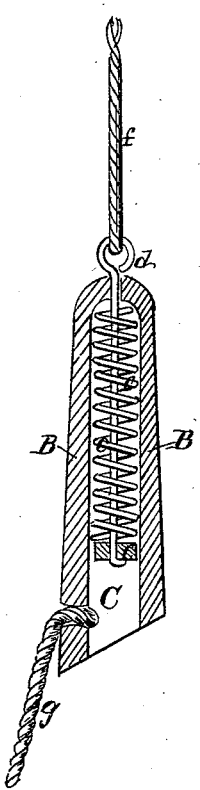
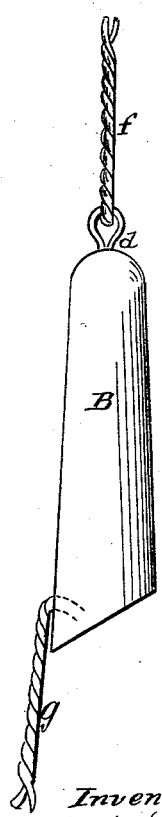
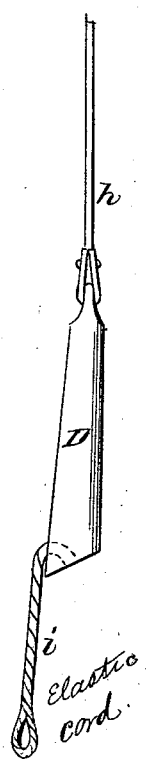

J. D. LEACH AND SABIN HUTCHINGS, OF PENOBSCOT, MAINE.

Letters Patent No. 84,885, dated December 15, 1868.

IMPROVEMENT IN FISHING-TACKLE.

The Schedule referred to in these Letters Patent and making part of the same.

*To all whom it may concern:*

Be it known that we, J. D. LEACH and SABIN HUTCHINGS, of Penobscot, in the county of Hancock, and State of Maine, have invented new and useful Improvements in Fishing-Tackle; and we do hereby declare that the following is a full, clear, and exact description of the construction and operation of the same, reference being had to the accompanying drawings, making a part of this specification, in which—

Figure 1 is a perspective view of a hook and part of a line, with an elastic section inserted in the line.

Figure 4 is a perspective view of a lead, with an elastic cord inserted in the lower end, to which the hook is to be attached.

The nature of our invention consists in combining with common fishing-tackle an elastic section of rubber, near the hook, for the purpose of facilitating the hooking of the fish when biting, and preventing the liability of tearing the hook from the gills when hauling the fish in.

To enable others skilled in the art to make and use our invention, we will proceed to describe its construction and operation.

In the drawings, A is a mackerel-jig, to which is attached a line marked $a\ a$, while $b$ is a section of India rubber, which is inserted between the two parts $a\ a$ of the line.

D is a solid lead, to the upper end of which the usual line $h$ is attached, while to the lower end the elastic-rubber-cord $i$ is secured, and to this elastic the hook is attached.

By thus employing an elastic section of line, the hook yields to the efforts of the fish, when biting, more readily than it would be, played out by the angler or fisherman, thus inducing the fish to strengthen his hold upon the bait, while the equally sudden reaction of the spring tends to fasten the hook in the gills of the fish, and when the angler draws the fish upward, the yielding of the elastic part of the line counteracts the violent efforts of the fish to break free from the hook.

Having thus described our invention,

What we claim as new, and desire to secure by Letters Patent, is—

1. Inserting in the line, near the hook, an elastic section, substantially as described, and shown at $b$, fig. 1.

2. An elastic cord, interposed between the sinker and hook, in maner, substantially as described, and shown at $i$, fig. 4.

3. Combining with fishing-tackle an elastic spring or section of rubber, so arranged near the hook as to produce the results and accomplish the objects herein set forth.

J. D. LEACH.
SABIN HUTCHINGS.

Witnesses:
MILTON WARDWELL,
HIRAM F. LEACH.